(12) United States Patent
Maeda et al.

(10) Patent No.: US 10,576,967 B2
(45) Date of Patent: Mar. 3, 2020

(54) PARKING ASSISTANCE DEVICE AND PARKING ASSISTANCE METHOD

(71) Applicant: DENSO CORPORATION, Kariya, Aichi-pref. (JP)

(72) Inventors: Yu Maeda, Nisshin (JP); Taketo Harada, Nisshin (JP); Mitsuyasu Matsuura, Nisshin (JP); Hirohiko Yanagawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/305,230

(22) PCT Filed: May 25, 2017

(86) PCT No.: PCT/JP2017/019617
§ 371 (c)(1),
(2) Date: Nov. 28, 2018

(87) PCT Pub. No.: WO2017/208976
PCT Pub. Date: Dec. 7, 2017

(65) Prior Publication Data
US 2019/0291722 A1    Sep. 26, 2019

(30) Foreign Application Priority Data

May 30, 2016   (JP) ................... 2016-107623

(51) Int. Cl.
*B60W 30/06*    (2006.01)
*B60W 10/04*    (2006.01)
(Continued)

(52) U.S. Cl.
CPC ............. *B60W 30/06* (2013.01); *B60R 21/00* (2013.01); *B60W 10/04* (2013.01); *B60W 10/18* (2013.01);
(Continued)

(58) Field of Classification Search
CPC ...... B60W 30/06; B60W 10/20; B60W 10/18; B60W 10/04; B60W 2710/20;
(Continued)

(56) References Cited

U.S. PATENT DOCUMENTS

2009/0123028 A1    5/2009  Satonaka
2010/0259420 A1*  10/2010  Von Reyher ......... B62D 15/028
                                                340/932.2

(Continued)

FOREIGN PATENT DOCUMENTS

JP    2007-320433 A    12/2007
JP    2010/140458 A1   12/2010
(Continued)

*Primary Examiner* — Behrang Badii
*Assistant Examiner* — Hossam M Abd El Latif
(74) *Attorney, Agent, or Firm* — Knobbe, Martens, Olson & Bear, LLP

(57) ABSTRACT

A parking assistance device is applied to a vehicle equipped with a camera for capturing an image of an area in front of the vehicle and is configured to assist forward parking of the vehicle in a parking space. The parking assistance device includes: a position estimation unit which, in a situation where the vehicle is advancing toward the parking space in a lateral passage of the parking space, estimates, based on an image captured by the camera, at least one of a first corner position, which is a near-side corner position at a vehicle entrance part of the parking space, and a second corner position, which is a far-side corner position at the vehicle entrance part, before the vehicle passes by the parking space; and a space recognition unit which recognizes the parking space for forward parking based on the at least one estimated corner position.

3 Claims, 4 Drawing Sheets

(51) Int. Cl.
 B60W 10/18 (2012.01)
 B60W 10/20 (2006.01)
 G06K 9/00 (2006.01)
 G08G 1/16 (2006.01)
 G01B 11/00 (2006.01)
 B60R 11/04 (2006.01)
 B60R 21/00 (2006.01)
(52) U.S. Cl.
 CPC ............ B60W 10/20 (2013.01); G01B 11/00 (2013.01); G06K 9/00791 (2013.01); G08G 1/16 (2013.01); G08G 1/168 (2013.01); *B60R 11/04* (2013.01); *B60W 2420/42* (2013.01); *B60W 2520/06* (2013.01); *B60W 2520/10* (2013.01); *B60W 2550/14* (2013.01); *B60W 2710/18* (2013.01); *B60W 2710/20* (2013.01)
(58) Field of Classification Search
 CPC ......... B60W 2710/18; B60W 2550/14; B60W 2520/10; B60W 2520/06; B60W 2420/42; B60R 21/00; B60R 11/04; G01B 11/00; G08G 1/16; G08G 1/168; G06K 9/00791
 See application file for complete search history.

(56) References Cited

U.S. PATENT DOCUMENTS

| 2011/0057814 A1* | 3/2011 | Park ...................... B60W 10/18 340/932.2 |
| 2012/0072067 A1* | 3/2012 | Jecker ................ B62D 15/0285 701/25 |
| 2018/0178780 A1* | 6/2018 | Hwang ................. B60W 30/06 |

FOREIGN PATENT DOCUMENTS

| JP | 2015-30363 A | 2/2015 |
| WO | 2006/115139 A1 | 11/2006 |

* cited by examiner

PARKING ASSISTANCE DEVICE AND PARKING ASSISTANCE METHOD

CROSS REFERENCE TO RELATED APPLICATION

The present application is a national stage application of PCT Application No. PCT/JP2017/019617, filed on May 25, 2017, which is based on Japanese Application No. 2016-107623 filed on May 30, 2016, the contents of which are incorporated herein by reference.

TECHNICAL FIELD

The present disclosure relates to a parking assistance device and a parking assistance method, and in particular, to a parking assistance device and a parking assistance method applied to a vehicle equipped with a camera that captures an image of an area in front of the vehicle.

BACKGROUND ART

A conventional, known parking assistance device uses a ranging sensor or an in-vehicle camera to recognize the environment around the vehicle, and recognizes the parking space or calculates the parking route based on the recognition result (see, for example, PTL 1). The parking assistance device of PTL 1 detects the empty space of a parking space formed in a parking lot and predicts a plurality of patterns of leaving route for leaving from the detected empty space. In addition, it is disclosed that a leaving route is selected from the plurality of patterns based on their difficulty levels, and guidance of a forward or reverse parking method is given as the parking method for leaving in the selected leaving route.

CITATION LIST

Patent Literature

[PTL 1] JP 2007-320433 A

SUMMARY OF THE INVENTION

The forward parking, i.e., parking by making the vehicle enter the parking space forwards, requires a shorter route for parking as compared with the reverse parking, i.e., parking by making the vehicle enter in reverse. On the other hand, in the case of forward parking, since the vehicle directly enters the parking space from a lateral passage in front of the parking space, it is necessary to start the steering before reaching the parking space. At this time, if the recognition of the parking space is delayed, the start of steering to enter the parking space is delayed, and as a result the driver must repeatedly steer the vehicle and move the vehicle back and forth to park the vehicle.

The present disclosure has been made in view of the above points, and an object thereof is to provide a parking assistance device and a parking assistance method capable of recognizing a parking space at an early stage and smoothly performing forward parking to the parking space.

In order to solve the above points, the present disclosure adopts the following means.

A first aspect of the present disclosure relates to a parking assistance device applied to a vehicle equipped with a camera for capturing an image of an area in front of the vehicle and configured to assist forward parking of the vehicle in a parking space. The parking assistance device comprises: a position estimation unit which, in a situation where the vehicle is advancing toward the parking space in a lateral passage of the parking space, estimates, based on an image captured by the camera, at least one of a first corner position, which is a near-side corner position at a vehicle entrance part of the parking space, and a second corner position, which is a far-side corner position at the vehicle entrance part, before the vehicle passes by the parking space; and a space recognition unit which recognizes the parking space for forward parking based on the at least one corner position estimated by the position estimation unit.

According to the above configuration, the corner positions of the entrance part of the parking space in which the vehicle should be parked forward are estimated before the vehicle passes by the parking space, based on an image of an area in front of the vehicle captured by the camera. According to this configuration, since the parking space can be detected at an earlier stage before the vehicle passes by the parking space, the process required for forward parking the vehicle in the parking space can be started earlier. Therefore, according to the above configuration, forward parking in the parking space can be performed smoothly.

BRIEF DESCRIPTION OF THE DRAWINGS

The above and other objects, features, and advantages of the present disclosure will become clearer from the following detailed description with reference to the accompanying drawings. In the drawings.

DESCRIPTION OF THE EMBODIMENTS

First Embodiment

Figure 1:
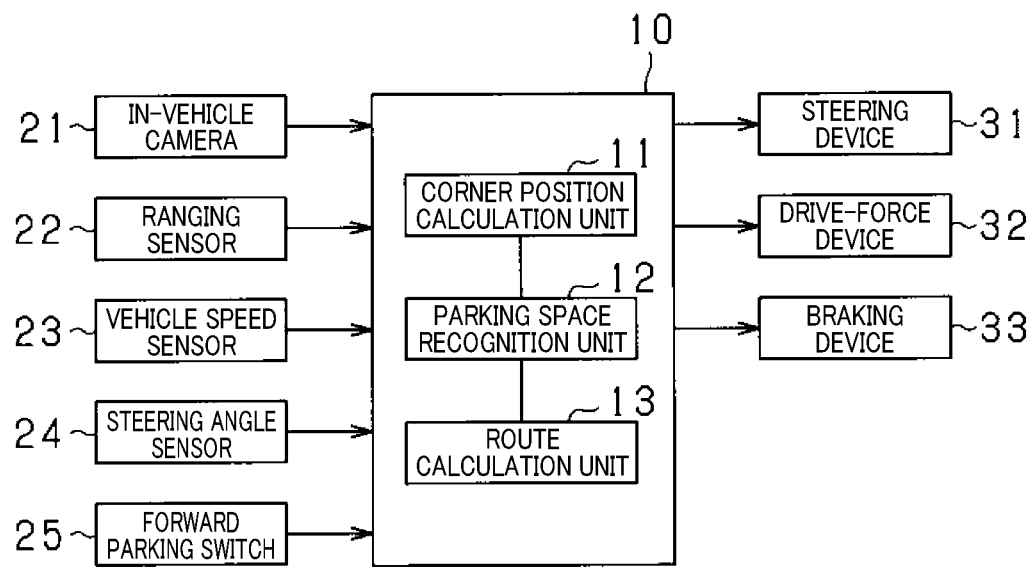
FIG. 1 is a block diagram showing the general configuration of the parking assistance system.

The first embodiment will be described below with reference to the drawings. The same or equivalent parts in the embodiments described below are assigned with the same reference number in the drawings, and an earlier explanation should be referred to regarding those parts having the same reference number as another.

First, a parking assistance system of this embodiment will be described with reference to FIGS. 1 and 2. The parking assistance system of this embodiment is mounted on a vehicle (hereinafter referred to as "own vehicle"). As shown in FIG. 1, the parking assistance system includes an in-vehicle camera 21, a ranging sensor 22, and a parking assistance device 10.

The in-vehicle camera 21 comprises, for example, a CCD camera, a CMOS image sensor, a near infrared camera, or the like. The in-vehicle camera 21 is attached to a front part of the vehicle 40, at the center of the vehicle width and at a certain height (for example, above the front bumper), and it captures an image of an area spreading at a predetermined angle in front of the vehicle in the bird's eye view. The in-vehicle camera 21 may be a monocular camera or a stereo camera.

The ranging sensor 22 is a sensor that detects the distance to an obstacle existing near the own vehicle 40. In the present embodiment, the ranging sensor 22 transmits a probe wave at certain control intervals, and receives the reflected wave reflected by the obstacle existing near the own vehicle 40. The distance from the own vehicle 40 to the obstacle existing near the own vehicle 40 is calculated based on round-trip time which is the time from transmission to reception. The ranging sensor 22 may be, for example, an ultrasonic sensor such as a sonar sensor. It should be noted that the ranging sensor 22 is not limited to an ultrasonic sensor, but may be a sensor such as a laser sensor, a millimeter wave sensor, or the like.

Figure 2:
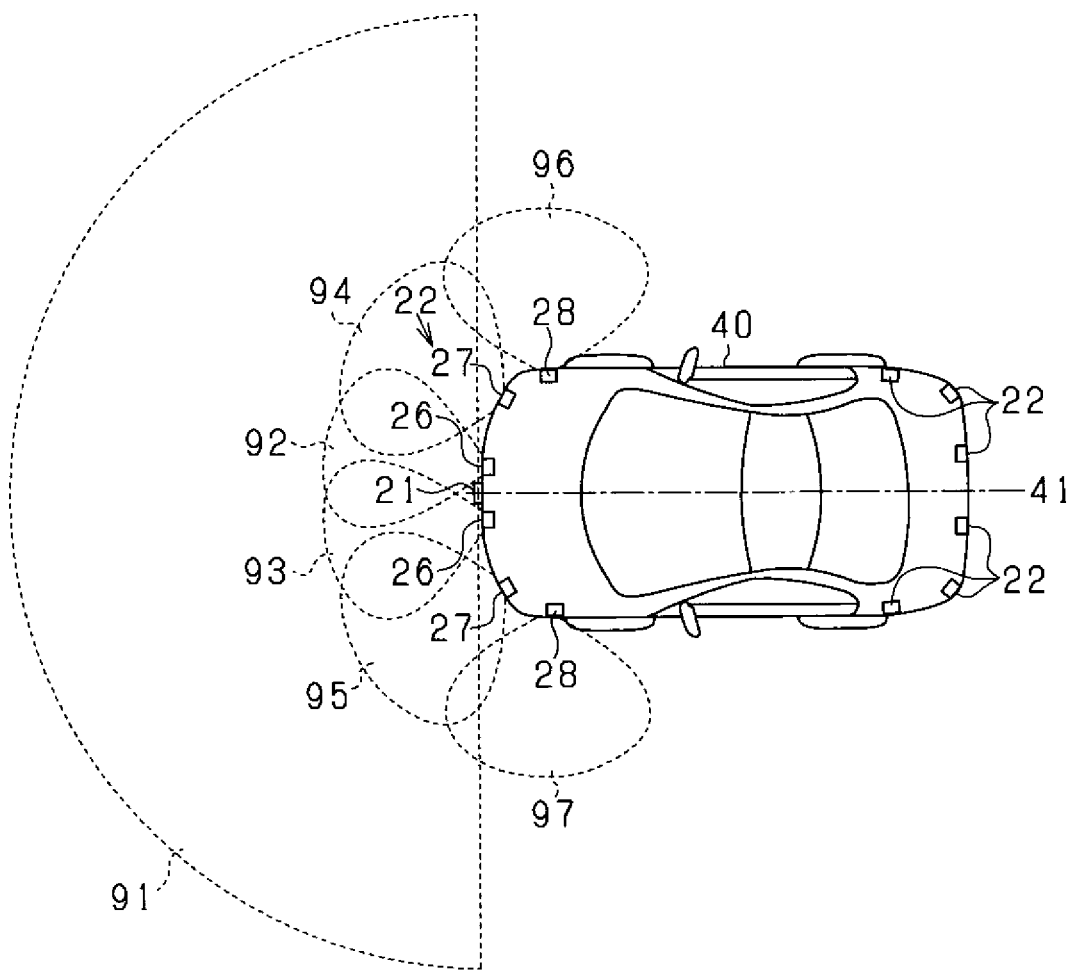
FIG. 2 is a diagram showing the installation position of the ranging sensor.

FIG. 2 is a diagram showing the installment position of the ranging sensor 22 in the own vehicle 40. The ranging sensor 22 is installed at a plurality of locations of the own vehicle 40. In the present embodiment, as shown in FIG. 2, a plurality of ranging sensors 22 having different detection areas are attached to the own vehicle 40 at certain intervals at the front bumper part, the rear bumper part, and the sides of the vehicle body.

Specifically, the ranging sensors 22 include center sensors 26 attached near the center axis 41 of the vehicle width and symmetrically with respect to the center axis 41, corner sensors 27 attached to the left corner and the right corner of the own vehicle 40, and lateral sensors 28 attached to the left side and the right side of the own vehicle 40. The center sensors 26 have detection areas 92 and 93 extending in front of the vehicle, the corner sensors 27 have detection areas 94 and 95 extending obliquely from the vehicle, and the lateral sensors 28 have detection areas 96 and 97 extending laterally from the vehicle. The reference number 91 represents an imaging area of the in-vehicle camera 21. As shown in FIG. 2, the in-vehicle camera 21 is capable of capturing an image of an area extending further than the detection areas of the ranging sensors 22.

In addition to the in-vehicle camera 21 and the ranging sensors 22 various sensors, switches, and the like are provided in the own vehicle 40 such as a vehicle speed sensor 23 for detecting the vehicle speed, a steering angle sensor 24 for detecting the steering angle, and a forward parking switch 25 for allowing the driver to command automatic parking by forward parking.

The parking assistance device 10 is a computer comprising a CPU, ROM, RAM, I/O, and the like, and it realizes various functions to perform parking assistance of the own vehicle 40 by executing programs installed in the ROM with the CPU. The ROM corresponds to a computer-readable storage medium serving as a non-transitory tangible storage medium. The parking assistance device 10 receives various kinds of information from the various sensors and switches provided in the own vehicle 40 and performs processing for recognizing a parking space existing around the own vehicle 40 based on the received various kinds of information. Further, the parking assistance device 10 calculates a parking route for automatically parking the own vehicle 40 to the recognized parking space, and controls a steering device 31, a drive-force device 32, and a braking device 33 of the own vehicle 40 so as to automatically park the own vehicle 40 according to the calculated parking route.

In the case of forward parking, when the own vehicle 40 is traveling toward the parking space in a lateral passage which is located near the entrance of the parking space, the parking assistance device 10 calculates a first corner position which is the corner position of the parking space that is closer to the vehicle, and a second corner position which is the corner position that is further from the vehicle, and recognizes the space between the first corner position and the second corner position as the parking space. The first corner position is also a corner position of the obstacle adjacent to the parking space that is closer to the vehicle (hereinafter also referred to as the "near side obstacle"), and the second corner position is also a corner position of the obstacle adjacent to the parking space that is further from the vehicle (hereinafter also referred to as the "far side obstacle"). The corner positions may be calculated by, for example, detecting the contour points of the near side obstacle and the far side obstacle based on the distance information acquired by the ranging sensor 22, and determining the corner positions based on the detection history of the contour points.

When the ranging sensor 22 is a sensor that transmits a probe wave and receives the reflected wave reflected by an obstacle, the reflection points on the obstacle of the probe waves transmitted from the ranging sensor 22 will be the contour points. In this case, a sequence of the reflection points is obtained, and the end point of the sequence, or a point offset by a predetermined distance from the end point of the sequence is identified as the corner position. The reflection points of the obstacle may be calculated by, for example, calculating the sensor position for each obstacle detection based on the vehicle speed detected by the vehicle speed sensor 23 and the steering angle detected by the steering angle sensor 24, and calculating the reflection points by the principle of triangulation based on based on the history of the obtained sensor positions and the history of the information on the distance to the obstacle.

In the case of forward parking, if the corner position of the far side obstacle adjacent to the parking space, that is, the second corner position is to be detected by the ranging sensor 22, the own vehicle 40 is required to once pass by the parking space, move backward after recognizing the far side environment of the parking space, and then calculate the route for automatic forward parking.

Figure 3:
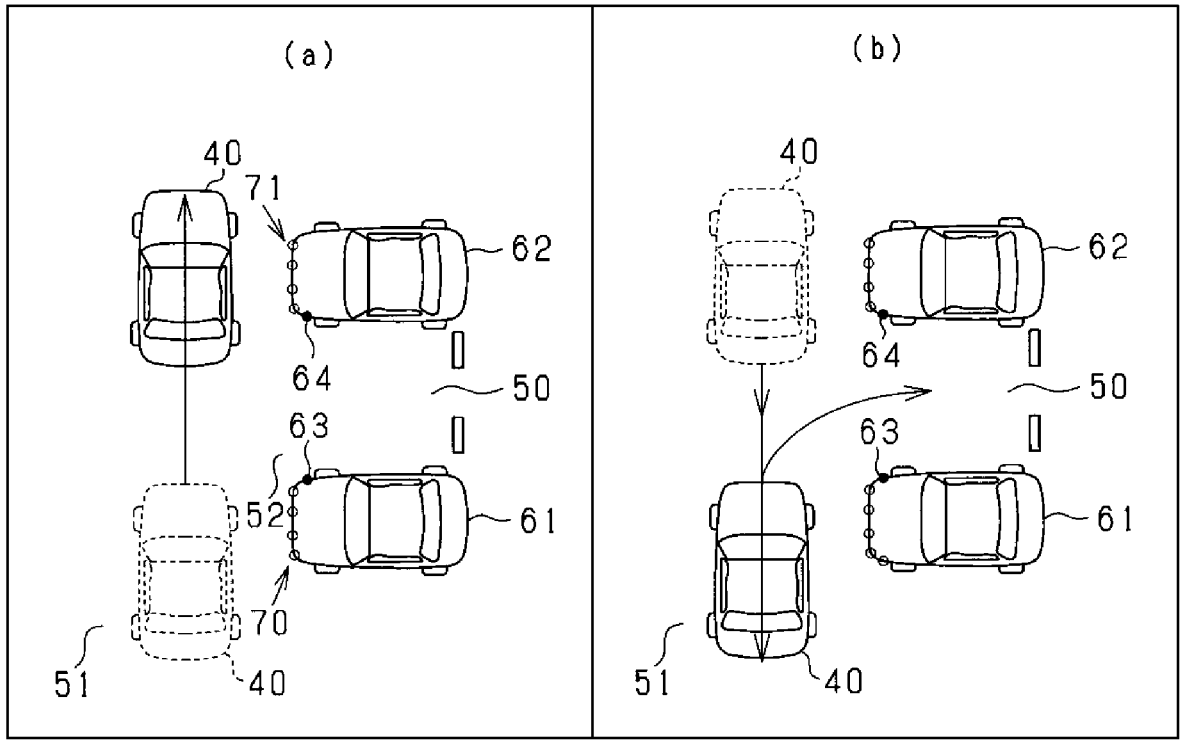
FIG. 3 is a diagram showing a case where forward parking is performed using the second corner position obtained from the detected distance of the ranging sensor.

FIG. 3 is a diagram showing a route of the own vehicle 40 when it is going to be automatically parked to the parking space 50 by forward parking by detecting the first corner position and the second corner position with the ranging sensor 22. In FIG. 3, it is assumed that the own vehicle 40 is parked forward from a lateral passage 51 in front of the parking space 50 that is sandwiched between two parallelly parked vehicles 61 and 62. The parked vehicle 61 corresponds to the near side obstacle, and the parked vehicle 62 corresponds to the far side obstacle.

In FIG. 3(a), as the own vehicle 40 passes by the parked vehicle 61 which is the near side obstacle, the distance to the parked vehicle 61 is successively detected by the ranging sensor 22 (mainly by the lateral sensor 28). As a result, the sequence of the reflection points 70 on the parked vehicle 61 is obtained. Based on this sequence, a far-side corner point 63 of the parked vehicle 61 is calculated as the first corner position. After that, the own vehicle 40 once passes in front the parking space 50 and travels to the front of the parked vehicle 62 which is the far side obstacle adjacent to the parking space 50. As a result, the sequence of the reflection points 71 on the parked vehicle 62 is obtained by the ranging sensor 22, and based on this sequence, a near-side corner point 64 of the parked vehicle 62 is calculated as the second corner position. Note that the "near-side corner point" the one of the corner positions (corner points) of an obstacle adjacent to the parking space 50 that is located closer to the own vehicle 40 when it is moving toward the parking space 50, and the "far-side corner point" is the corner point located further from the vehicle.

After that, as shown in FIG. 3(b), after the own vehicle 40 has passed by the parking space 50 and reversed to the vicinity of the parked vehicle 61, forward parking is performed toward the parking space 50 which has been recognized from the first corner position and the second corner position detected by the ranging sensor 22. However, when such a method is applied, the route for the forward parking to the parking space 50 becomes long, and this may cause a time loss.

In view of such matters, the present embodiment estimates the corner positions of the parking space 50 based on the image captured by the in-vehicle camera 21, and recognizes the parking space 50 for forward parking using the estimated corner positions. In particular, the present embodiment calculates the first corner position based on the distance information acquired by the ranging sensor 22, and estimates the second corner position based on the image captured by the in-vehicle camera 21.

Figure 4:
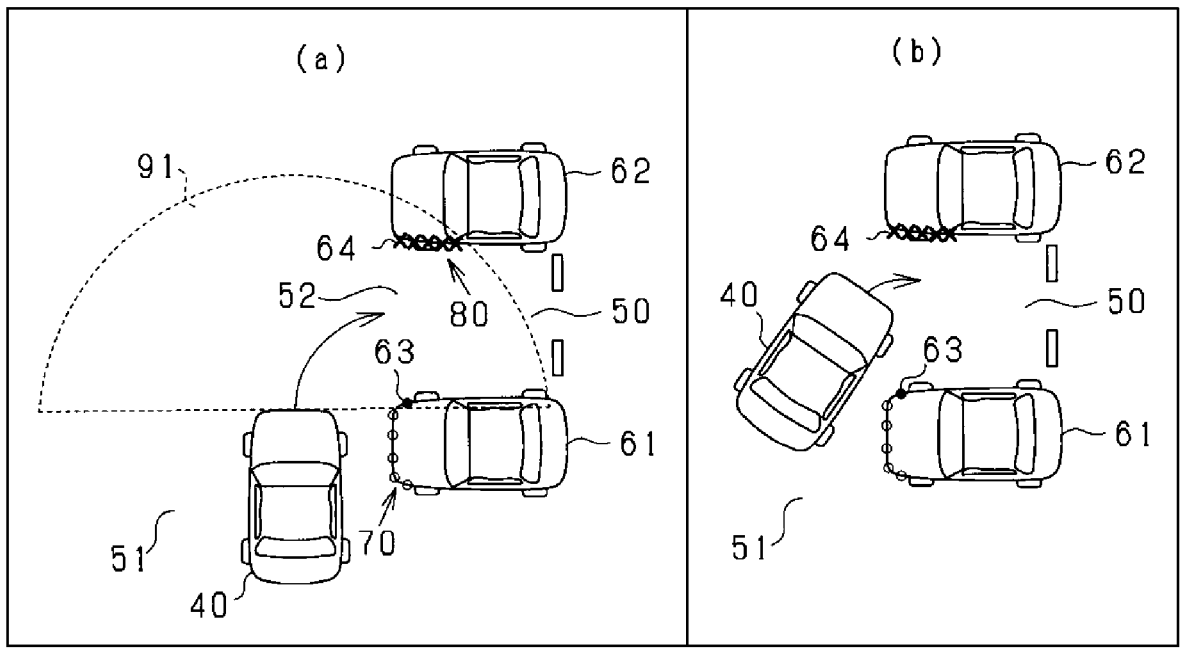
FIG. 4 is a diagram showing a case where forward parking is performed using the second corner position estimated from the captured image.

FIG. 4 is a diagram showing the route of the own vehicle 40 in the case it is parked forward using the image captured by the in-vehicle camera 21. In FIG. 4, as with FIG. 3, it is assumed that the own vehicle 40 is parked forward from the lateral passage 51 in the front of the parking space 50 that is sandwiched between two parallelly parked vehicles 61 and 62.

In FIG. 4(a), when the own vehicle 40 passes by the parked vehicle 61 on the near side of the parking space 50, the parking assistance device 10 calculates the far-side corner point 63 of the parked vehicle 61 as the first corner position from the sequence of the reflection points 70 on the parked vehicle 61 detected by the ranging sensor 22. Further, by obtaining from the image the position information of the parked vehicle 62 which is the far-side obstacle, the near-side corner point 64 of the parked vehicle 62 on the far side is estimated as the second corner position. After recognizing the parking space 50 from the first corner position and the second corner position thus determined, as shown in FIG. 4(b), automatic parking is performed for forward parking toward the recognized parking space 50. According to this method, since the parking space 50 can be recognized when the own vehicle 40 passes by the near-side obstacle, the need for preparing a route for recognizing the parking space 50 is eliminated. In addition, since the parking space 50 can be recognized when the vehicle passes by the near-side obstacle, steering can be performed earlier. Thus, it is possible to park the vehicle directly in the parking space 50 without turning the steering wheel a plurality of times.

As a configuration for performing forward parking as described above, as shown in FIG. 1, the parking assistance device 10 includes a corner position calculation unit 11, a parking space recognition unit 12, and a route calculation unit 13.

The corner position calculation unit 11 inputs the captured image of the in-vehicle camera 21 and the detected distance of the ranging sensor 22. Further, it calculates the first corner position of the parking space 50 using the input detected distance of the ranging sensor 22, and estimates the second corner position using the captured image of the in-vehicle camera 21. The corner position calculation unit 11 functions as the "position estimation unit" and the "position detection unit".

Speaking more specifically about the estimation of the second corner position based on the image, the corner position calculation unit 11 first extracts edge points as feature points indicating the presence of a target in the captured image in order to detect the boundary edge of the far-side obstacle (the parked vehicle 62 in FIG. 4) of the parking space 50. Further, based on the detected boundary edge, it estimates an area in which the far-side obstacle exists, and based on the estimated existence area and the distance information of the target with respect to the own vehicle 40 obtained from the image, it estimates the corner position of the far-side obstacle that is closer to the parking space 50, that is, the near-side corner point 64 of the parked vehicle 62. FIG. 4 shows edge points 80 of the parked vehicle 62 extracted from the captured image and converted for a bird's-eye view. Based on the surface information of the obstacle obtained from the edge points 80, the corner position of the obstacle closer to the parking space 50, that is, the second corner position is estimated.

Note that the way of detecting an obstacle adjacent to the parking space 50 using the in-vehicle camera 21 is not particularly limited. For example, it may be performed by three-dimensional object detection based on parallax information obtained from a plurality of images taken from different positions. When the in-vehicle camera 21 is a monocular camera, it is carried out according to the principle of deriving parallax from sequential images. In addition, the obstacle detection by the in-vehicle camera 21 may identify the type of the target recognized by the in-vehicle camera 21 by performing pattern matching on the image target using predetermined patterns.

In estimating the second corner position, the distance information of the target with respect to the own vehicle 40 on the image is acquired based on disparity information obtained from a plurality of images captured from different positions. For example, when the in-vehicle camera 21 is a stereo camera, parallax information is acquired for each pixel from images captured simultaneously by a plurality of cameras, and distance information of the target is acquired using the parallax information. When the in-vehicle camera 21 is a monocular camera, it is carried out according to the principle of deriving parallax from sequential images. Specifically, parallax information is acquired for each pixel from a plurality of frames captured at different timings and the movement distances between frames, and distance information of the target is acquired using the parallax information.

The parking space recognition unit 12 inputs the position information of the first corner position and the second corner position acquired by the corner position calculation unit 11, and sets the space between the first corner position and the second corner position as the parking space 50. At this time, it is also possible to determine whether or not the own vehicle 40 can be parked in the space based on the width of the space between the first corner position and the second corner position and the vehicle width of the own vehicle 40, and set the space as the parking space 50 when it is determined that parking is possible.

The route calculation unit 13 calculates a route for forward parking the own vehicle 40 in the parking space 50 recognized by the parking space recognition unit 12. The steering device 31, the drive-force device 32, and the braking device 33 are controlled by the parking assistance device 10 so that the own vehicle 40 is automatically parked forward in the parking space 50 following the route thus calculated.

Next, the parking assistance process executed by the parking assistance device 10 of the present embodiment will be described with reference to the flowchart of FIG. 5. This process is executed by the CPU of the parking assistance device 10 when an ON signal is input from the forward parking switch 25.

Figure 5:
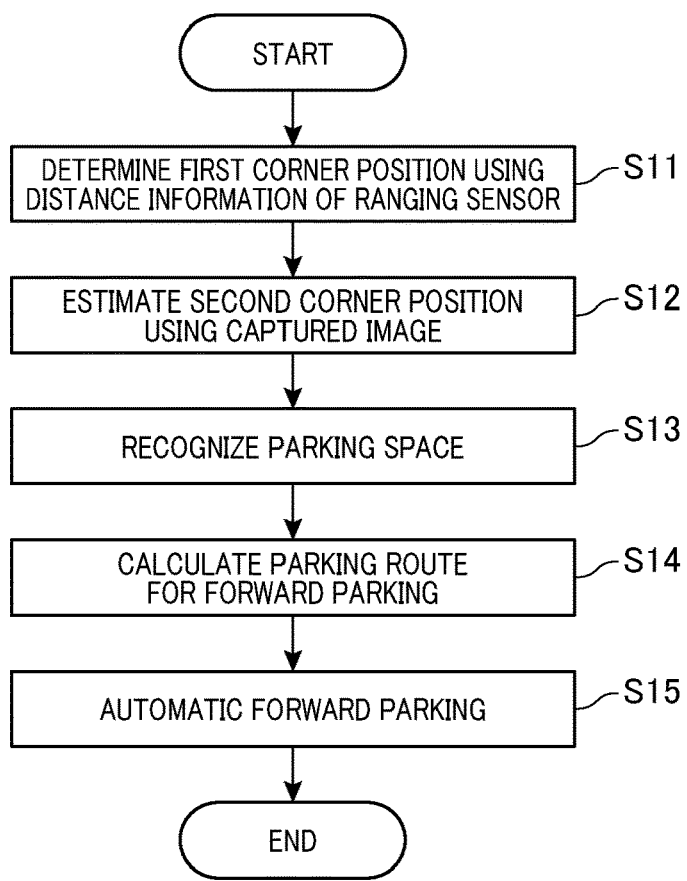
FIG. 5 is a flowchart showing the procedures of the parking assistance process.

In FIG. 5, in step S11, using the distance information acquired by the ranging sensor 22, the sequence of the reflection points on the near-side obstacle is detected, and the first corner position is identified from the sequence. In step S12, the position information of the far-side obstacle (62) is acquired from an image taken before the vehicle passes by the parking space 50, and the second corner position is estimated. In the following step S13, the space between the first corner position and the second corner position is recognized as the parking space 50. After that, in step S14, a route for forward parking the own vehicle 40 in the parking space 50 is calculated. In step S15, actuation commands are output to the steering device 31, the drive-force device 32, and the braking device 33 so that the forward parking is automatically performed based on the calculated route, and then the present process is terminated.

According to the present embodiment described above, the following advantageous effects can be obtained.

The corner positions of a vehicle entrance part 52 of the parking space 50 in which the own vehicle 40 should be parked forward are estimated before the own vehicle 40 passes by the parking space 50, based on an image of an area in front of the vehicle captured by the in-vehicle camera 21. According to this configuration, since the parking space 50 can be detected before the own vehicle 40 passes by the parking space 50, the process required for forward parking the vehicle in the parking space 50, specifically, the process including steering, route calculation, and the like can be started earlier. Therefore, forward parking in the parking space 50 can be performed smoothly.

The position information of the far-side obstacle of the parking space 50 is acquired from an image taken by the in-vehicle camera 21 before the vehicle passes by the parking space 50, in order to estimate the second corner position. More specifically, by extracting edge points of the far-side obstacle of the parking space 50 from the image, the existence area of the second corner position is estimated, and the second corner position is estimated based on the estimated existence area and distance information of the far-side obstacle acquired from the image. If the second corner position is to be determined using the ranging sensor 22, the own vehicle 40 needs to pass by the parking space 50 once and advance to the far-side obstacle located beyond the parking space 50. In this respect, according to the configuration that determines that corner position, which is in the area not suitable for detection by the ranging sensor 22, from the image of the in-vehicle camera 21, it is possible to obtain the second corner position before passing by the parking space 50 without disadvantageously advancing the own vehicle 40 to the far-side obstacle located beyond the parking space 50.

The first corner position is detected based on the detection history of contour points of the near-side obstacle detected by the ranging sensor 22, and the space between the detected first corner position and the second corner position estimated using the captured image is recognized as the parking space 50. According to this configuration, in a situation where the own vehicle 40 is advancing toward the parking space 50, an obstacle on the near side of the parking space 50 is recognized by the ranging sensor 22, whereas the obstacle on the far side of the parking space 50 can be recognized by the in-vehicle camera 21. In addition, since the first corner position is detected using the ranging sensor 22 having a higher detection accuracy for three-dimensional objects, the detection accuracy is higher. Therefore, according to the above configuration, it is possible to achieve both recognition of the parking space at an earlier stage and high recognition accuracy.

The above technique is applied to a system that performs automatic parking control which parks the own vehicle 40 automatically in the parking space 50 by forward parking based on the recognition result of the parking space 50. According to the method of recognizing the parking space 50 of the present disclosure, since the parking space 50 can be recognized while the own vehicle 40 is advancing toward the parking space 50, by combining this with automatic parking control, the own vehicle 40 can be smoothly forward parked in the parking space 50.

Second Embodiment

The second embodiment will now be explained focusing on its differences from the first embodiment. In the first embodiment, in order to recognize the parking space 50, the first corner position is identified using the distance information acquired by the ranging sensor, and the second corner position is estimated using the captured image. On the other hand, in the present embodiment, the parking space 50 is recognized by estimating the first corner position and the second corner position using the captured image.

Figure 6:
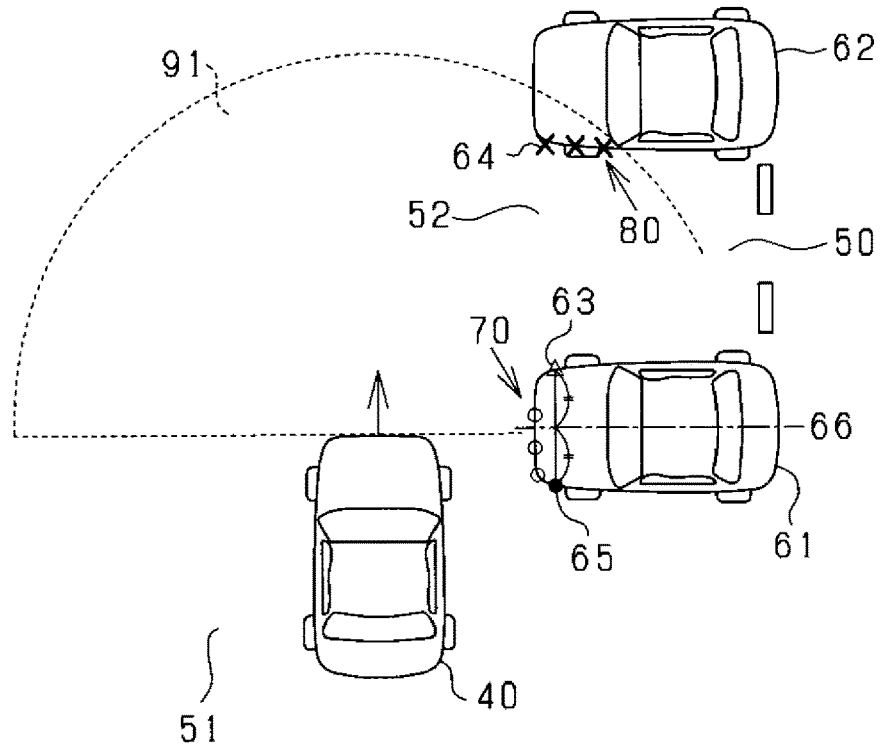
FIG. 6 is a diagram for explaining the way of estimating the first corner position using the captured image.

FIG. 6 is a diagram for explaining the way of estimating the first corner position using the captured image. Since the second corner position is estimated in the same manner as in the first embodiment, the description thereof will be omitted. In FIG. 6, as with FIG. 4, it is assumed that the own vehicle 40 is parked forward from the lateral passage 51 in front of the parking space 50 that is sandwiched between two parallelly parked vehicles 61 and 62. However, in FIG. 6, it is assumed that the own vehicle 40 has not approached the parking space 50 so much, and the first corner position is not yet detected by the ranging sensor 22.

In FIG. 6, the near-side corner point 65, which is the one of the corner positions of the parked vehicle 61 as the near-side obstacle that is on the side opposite to the parking space 50 and on the side of the lateral passage 51, is already detected based on the sequence of the reflection points 70 of the ranging sensor 22, but the far-side corner point 63 as the first corner position is not. In such a case, in the present embodiment, based on the image captured by the in-vehicle camera 21, a position obtained by offsetting the near-side corner point 65 of the parked vehicle 61 by a predetermined amount in the direction in which the own vehicle 40 advances toward the parking space 50 is estimated as the first corner position. In other words, based on the near-side corner point 65 of the parked vehicle 61 detected by the ranging sensor 22 and the symmetry of the parked vehicle 61 detected by the in-vehicle camera 21, the first corner position which is the far-side corner point 63 of the parked vehicle 61 is estimated.

More specifically, when the vehicle is to be parked parallelly with parked vehicles 61 and 62, the corner position calculating unit 11 extracts a feature(s) (for example, the front grille, lamps, license plate, door mirror, etc.) indicating the symmetry of the own vehicle 40 in the vehicle width direction from the image captured by the in-vehicle camera 21 by, for example, pattern matching or the like. According to the extracted feature, a vehicle center axis 66 of the parked vehicle 61 is estimated. Then, the near-side corner point 65 detected by the ranging sensor 22 is mirror-inverted with respect to the estimated vehicle center axis 66, and the obtained position is estimated as the far-side corner point 63, that is, the first corner position. The near-side corner point 65 of the parked vehicle 61 corresponds to a third corner position.

Figure 7:
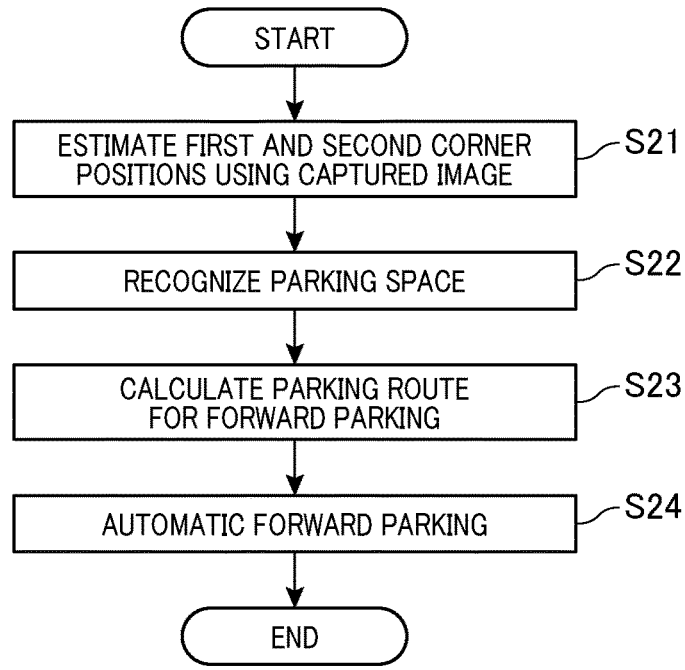
FIG. 7 is a flowchart showing the procedures of the parking assistance process of the second embodiment.

Next, the parking assistance process executed by the parking assistance device 10 of the present embodiment will be described with reference to the flowchart of FIG. 7. This process is executed by the CPU of the parking assistance device 10 when an ON signal is input from the forward parking switch 25. In the description of FIG. 7, the steps that are the same as those in FIG. 5 are given the step numbers in FIG. 5 and the description thereof is omitted.

In FIG. 7, in step S21, the first corner position and the second corner position are estimated using the captured image. At this time, the first corner position is estimated based on the near-side corner point 65 of the parked vehicle 61 detected by the ranging sensor 22 and the symmetry of the parked vehicle 61 detected by the in-vehicle camera 21. The second corner position is estimated by acquiring the position information of the far-side obstacle of the parking space 50 from an image taken by the in-vehicle camera 21. In the following steps S22 to S24, the same processing as the steps S13 to S15 in FIG. 5 is executed, and the present cycle ends.

According to the present embodiment described above, since the parking space 50 is recognized by estimating the first corner position and the second corner position using the captured image, it is possible to recognize the parking space 50 for forward parking at an earlier stage.

The third corner position is detected based on the detection history of contour points of the near-side obstacle detected by the ranging sensor 22, and a position obtained by, based on the image captured by the in-vehicle camera 21 offsetting the detected third corner position by a predetermined amount in the direction in which the own vehicle 40 advances toward the parking space 50 is estimated as the first corner position. According to such a configuration, it is possible to obtain the first corner position before the first corner position is detected by the ranging sensor 22, that is, at an earlier stage while the own vehicle 40 is passing by the near-side obstacle. As a result, it is possible to recognize the parking space 50 for forward parking at an earlier stage.

Other Embodiments

The present disclosure is not limited to the above embodiments, and it may be implemented as follows, for example.

In the above embodiments, if the second corner position is detected by the ranging sensor 22, and the second corner position estimated based on the image and the second corner position detected by the ranging sensor 22 are within a predetermined area in which they can be deemed to be located at the same position, the estimation reliability of the second corner position by the image may be made higher than when the second corner position is not detected by the ranging sensor 22. In some cases, for example, the corner sensor 27 may be able to detect the second corner position before the own vehicle 40 passes by the parking space 50. In such a case, it can be said that it is more likely that the second corner position estimated using the captured image exists at the estimated position. In view of this point, by adopting the above configuration, parking assistance can be performed in a manner according to the estimation reliability of the second corner position. Specifically, for example, when the estimation reliability of the second corner position is high, the forward parking is performed at a higher speed. Alternatively, when the estimation reliability of the second corner position is high, a route having a higher difficulty may be calculated, and when the estimation reliability of the second corner position is low, forward parking may be performed with a safer route.

Figure 8:
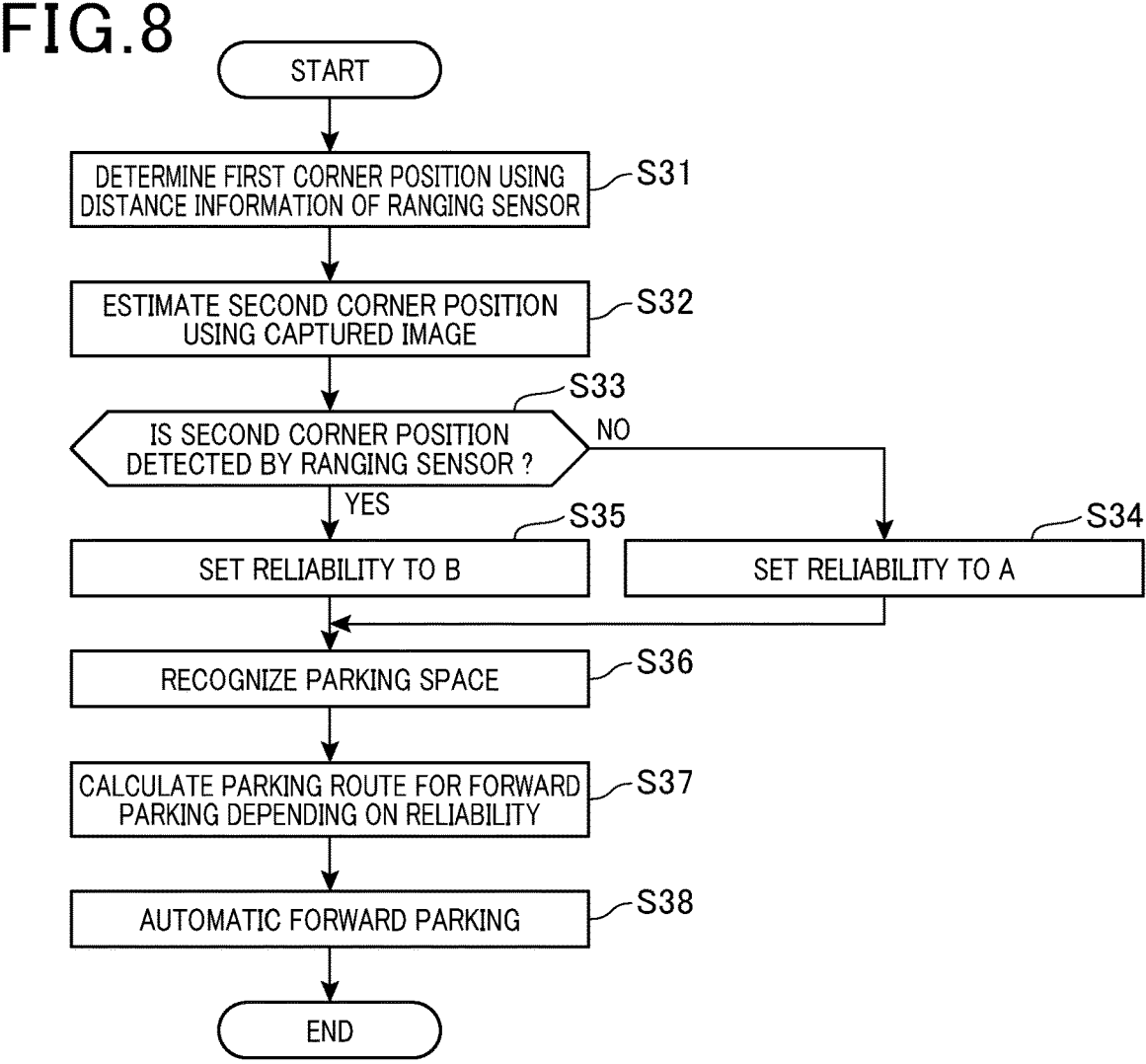
FIG. 8 is a flowchart showing the procedures of the parking assistance process of another embodiment.

FIG. 8 is a flowchart showing the procedures of the parking assistance process in which the estimation reliability of the second corner position is changed based on the detection result of the ranging sensor 22. In the description of FIG. 8, the steps that are the same as those in FIG. 5 are given the step numbers in FIG. 5 and the description thereof is omitted. In FIG. 8, in steps S31 to S32, the same processing as the steps S11 to S12 in FIG. 5 is executed. In the following step S33, it is determined whether or not the second corner position is detected by the ranging sensor 22. Here, it is determined whether or not a sequence of the reflection points of the far-side obstacle is detected. If the second corner position is not detected by the ranging sensor 22, the process proceeds to step S34, and the estimation reliability of the second corner position according to the image is set to "A". On the other hand, if the second corner position is detected by the ranging sensor 22, the process proceeds to step S35, and the estimation reliability of the second corner position according to the image is set to "B" which is higher than "A". In the following step S36, the parking space 50 is recognized based on the first corner position and the second corner position. Further, in step S37, a parking route for forward parking is calculated according to the estimation reliability. At this time, when the estimation reliability of the second corner position is A, a route that is safer than that in the case of B is chosen. After that, the process ends.

In the above embodiments, the parking route for forward parking may be calculated based on whether or not presence of a far-side obstacle adjacent to the parking space 50 is detected according to the captured image of the in-vehicle camera 21. For example, when it is detected that there is no far-side obstacle, as compared with when a far-side obstacle is detected, a route with a higher reliability of one-time forward parking is calculated.

In the above embodiments, when it is detected that there is no far-side obstacle adjacent to the parking space 50, and a marking line is recognized on the far side of the parking space 50 by the in-vehicle camera 21, the parking space 50 may be corrected based on the information on the position and orientation of the near-side obstacle. For example, based on the sequence of the reflection points 70 of the near-side obstacle detected by the ranging sensor 22, the offset of the near-side obstacle in the direction toward the parking space 50 and the orientation of the near-side obstacle with respect to the parking space 50 are recognized, and the parking space 50 is corrected based on the recognized information.

The position of the estimated existence area of the second corner position based on the edge points of the far-side obstacle may be changed according to the orientation of the far-side obstacle. The actual position of the second corner position differs with respect to the estimated position depending on the orientation of the far-side obstacle. Specifically, comparing a case where the parked vehicle 62 as the far-side obstacle is parked with its front facing forward, i.e., parked in a direction that is perpendicular to the direction in which the own vehicle 40 moves toward the parking space 50, and a case where it is obliquely parked in such a manner that its front is inclined toward the own vehicle 40, in the latter, the estimated second corner position exists at a position that is further from the lateral passage 51 as compared with the former. Therefore, in the latter case, the parking space 50 is recognized assuming that the actual second corner position is closer to the lateral passage 51 than the estimated second corner position. This makes it possible to recognize the parking space 50 more accurately.

In the above embodiments, a case was explained where the own vehicle 40 is parked parallelly in the parking space 50 sandwiched between two parallelly parked vehicles 61 and 62. However, the configuration of the present disclosure may be applied to the case where the own vehicle 40 is serially parked in a parking space sandwiched between two serially parked vehicles. As with the former case, the parking space can be recognized earlier while the own vehicle 40 is heading toward the parking space, and serial parking in a single attempt can be realized. Further, the parking place is not particularly limited, and it may be an outdoor parking lot, an indoor parking lot, a garage, or the like.

In the above embodiments, a case is explained where techniques of the present disclosure is applied to a system that performs automatic parking control for parking the own vehicle 40 automatically by forward parking in the parking space 50 recognized by the parking space recognition unit 12. However, it may be applied to a system in which the parking assistance device 10 guides the route for forward parking the vehicle in the parking space 50, and the driver performs the operations for parking.

In the above embodiment, the ranging sensor 22 is configured to include a sensor that transmits a probe wave and receives the reflected wave reflected by an obstacle, but the distance to the obstacle may be measured by the in-vehicle camera 21. The in-vehicle camera as the ranging sensor may be a monocular camera or a stereo camera. When it is a monocular camera, the distance to the obstacle can be detected according to the principle of deriving parallax from sequential images. When the distance to the obstacle is to be measured by the in-vehicle camera, the function of capturing an image of the area in front of the vehicle and the function of measuring the distance to the obstacle may be performed by a single camera.

The above-described constituent elements are conceptual and are not limited to those of the above embodiments. For example, the function of one constituent element may be distributed to a plurality of constituent elements, or the functions of a plurality of constituent elements may be integrated into one constituent element.

Although the present disclosure is described based on examples, it should be understood that the present disclosure is not limited to the examples and structures. The present disclosure encompasses various modifications and variations within the scope of equivalence. In addition, the scope of the present disclosure and the spirit include other combinations and embodiments, only one component thereof, and other combinations and embodiments that are more than that or less than that.

The invention claimed is:

1. A parking assistance device applied to a vehicle equipped with a camera for capturing an image of an area in front of the vehicle and a ranging sensor, and configured to assist forward parking of the vehicle in a parking space, comprising:
    a position estimation unit which, in a situation where the vehicle is advancing toward the parking space in a lateral passage of the parking space, estimates, based on an image captured by the camera, a first corner position, which is a near-side corner position at a vehicle entrance part of the parking space, and a second corner position, which is a far-side corner position at the vehicle entrance part, before the vehicle passes by the parking space;
    a space recognition unit which recognizes the parking space for forward parking based on the at least one corner position estimated by the position estimation unit; and
    a position detection unit which detects contour points of a near-side obstacle located adjacent to the parking space on a near side of the parking space as viewed from the vehicle based on distance information acquired by the ranging sensor, and detects a third corner position, which is a corner position of the near-side obstacle that is on the side opposite to the parking space and on the side of the lateral passage, based on detection history of the contour points, wherein,
    the position estimation unit estimates the second corner position by acquiring, from the image, position information of a far-side obstacle located adjacent to the parking space on a far side of the parking space as viewed from the vehicle, and estimates the first corner position according to the symmetry of the near-side obstacle as a position obtained by, based on the image, mirror-inverting the third corner position detected by the position detection unit in a direction in which the vehicle advances toward the parking space.

2. The parking assistance device according to claim 1, wherein,
    the parking assistance device performs automatic parking control for automatically parking the vehicle in the parking space by forward parking based on a recognition result of the parking space from the space recognition unit.

3. A parking assistance method applied to a vehicle equipped with a camera for capturing an image of an area in front of the vehicle and a ranging sensor, and configured to assist forward parking of the vehicle in a parking space, comprising:
    estimating, in a situation where the vehicle is advancing toward the parking space in a lateral passage of the parking space, and based on an image captured by the camera, a first corner position, which is a near-side corner position at a vehicle entrance part of the parking space, and a second corner position, which is a far-side corner position at the vehicle entrance part, before the vehicle passes by the parking space; and
    recognizing the parking space for forward parking based on the estimated at least one corner position, wherein,
    contour points of a near-side obstacle located adjacent to the parking space on a near side of the parking space as viewed from the vehicle are detected based on distance information acquired by the ranging sensor, and a third corner position, which is a corner position of the near-side obstacle that is on the side opposite to the parking space and on the side of the lateral passage, is detected based on detection history of the contour points,
    the second corner position is estimated by acquiring, from the image, position information of a far-side obstacle located adjacent to the parking space on a far side of the parking space as viewed from the vehicle, and
    the first corner position is estimated according to the symmetry of the near-side obstacle as a position obtained by, based on the image, mirror-inverting the detected third corner position in a direction in which the vehicle advances toward the parking space.

\* \* \* \* \*